United States Patent
Costello

(10) Patent No.: US 6,307,586 B1
(45) Date of Patent: Oct. 23, 2001

(54) ELECTRON BOMBARDED ACTIVE PIXEL SENSOR CAMERA INCORPORATING GAIN CONTROL

(75) Inventor: Kenneth A. Costello, Union City, CA (US)

(73) Assignee: Intevac, Inc., Santa Clara, CA (US)

( * ) Notice: Subject to any disclaimer, the term of this patent is extended or adjusted under 35 U.S.C. 154(b) by 0 days.

(21) Appl. No.: 09/356,799

(22) Filed: Jul. 20, 1999

(51) Int. Cl.$^7$ .............................. H04N 5/225; H01J 40/14
(52) U.S. Cl. ..................................... 348/216; 250/214 VT
(58) Field of Search ..................................... 348/216, 217; 250/214 VT

(56) References Cited

U.S. PATENT DOCUMENTS

| | | |
|---|---|---|
| 3,891,795 * | 6/1975 | Johnson et al. ........................ 348/143 |
| 3,899,250 * | 8/1975 | Bamburg et al. ........................ 348/31 |
| 4,134,009 * | 1/1979 | Dippold .......................... 250/214 VT |
| 4,687,922 * | 8/1987 | Lemonier et al. .............. 250/214 VT |
| 4,760,031 | 7/1988 | Janesick . |
| 4,822,748 | 4/1989 | Janesick et al. . |
| 5,268,612 | 12/1993 | Aebi et al. . |
| 5,373,320 | 12/1994 | Johnson et al. . |
| 5,374,826 | 12/1994 | LaRue et al. . |
| 5,475,227 | 12/1995 | LaRue . |
| 5,521,639 | 5/1996 | Tomura et al. . |
| 5,614,744 | 3/1997 | Merrill . |
| 5,625,210 | 4/1997 | Lee et al. . |
| 5,631,704 | 5/1997 | Dickinson et al. . |
| 5,721,425 | 2/1998 | Merrill . |
| 5,739,562 | 4/1998 | Ackland et al. . |
| 5,789,774 | 8/1998 | Merrill . |
| 5,872,595 * | 2/1999 | Monahan ............................. 348/217 |
| 6,155,488 * | 12/2000 | Olmstead et al. ................... 235/440 |

FOREIGN PATENT DOCUMENTS 3-042971 * 2/1991 (JP) .............................. H04N/5/225

OTHER PUBLICATIONS

Fossum, E. R., CMOS Image Sensors: Electronic Camera On–A–Chip, IEEE Transactions on Electronic Devices, vol. 44, No. 10, pp. 1689–1698, (1997).
Gallium Arsenide Electron Bombarded CCD Technology, AEBI et al., SPIE vol. 3434, pp. 37–44, (1998).

* cited by examiner

Primary Examiner—Andrew B. Christensen
(74) Attorney, Agent, or Firm—Stanley Z. Cole

(57) ABSTRACT

A camera includes a photocathode operable in a night mode wherein electrons are generated in response to incident light, an active pixel sensor including an array of pixels for sensing electrons in the night mode, a power supply for energizing the photocathode in the night mode in response to a control signal, and a power supply control circuit for providing the control signal to the power supply in response to a sensed incident light level. The control signal may be a gating signal having a duty cycle that increases as the sensed incident light level decreases. The camera may be operable in a day mode wherein a fraction of the incident light is transmitted through the photocathode and is sensed by the active pixel sensor. The camera may further include an electron shielded light detector. A light detector signal generated by the electron shielded light detector may be used to control switching between the day mode and the night mode.

25 Claims, 6 Drawing Sheets

ELECTRON BOMBARDED ACTIVE PIXEL SENSOR CAMERA INCORPORATING GAIN CONTROL

FIELD OF THE INVENTION

This invention relates to electron bombarded active pixel sensor cameras and, more particularly, to electron bombarded active pixel sensor cameras which operate over a wide dynamic range and which incorporate gain control.

BACKGROUND OF THE INVENTION

Night vision cameras which operate under extremely low light levels are known in the art. Such cameras frequently utilize a microchannel plate or a highly sensitive photocathode for sensing of low light levels. A focused electron bombarded hybrid photomultiplier tube comprising a photocathode, focusing electrodes and a collection anode disposed in a detector body is disclosed in U.S. Pat. No. 5,374,826 issued Dec. 20, 1994 to LaRue et al and U.S. Pat. No. 5,475,227 issued Dec. 12, 1995 to LaRue. The disclosed hybrid photomultiplier tubes are highly sensitive but do not sense images. A surveillance system having a microchannel image intensifier tube is disclosed in U.S. Pat. No. 5,373,320 issued Dec. 13, 1994 to Johnson et al. A camera attachment converts a standard daylight video camera into a day/night vision video camera.

Image sensing devices which incorporate an array of image sensing pixels are commonly used in electronic cameras. Each pixel produces an output signal in response to incident light. The signals are read out, typically one row at a time, to form an image. Image sensors which incorporate an amplifier into each pixel for increased sensitivity are known as active pixel sensors. Active pixel sensors are disclosed, for example in U.S. Pat. No. 5,789,774 issued Aug. 4, 1998 to Merrill; U.S. Pat. No. 5,631,704 issued May 20, 1997 to Dickinson et al; U.S. Pat. No. 5,521,639 issued May 28, 1996 to Tomura et al; U.S. Pat. No. 5,721,425 issued Feb. 24, 1998 to Merrill; U.S. Pat. No. 5,625,210 issued Apr. 29, 1997 to Lee et al; U.S. Pat. No. 5,614,744 issued Mar. 25, 1997 to Merrill; and U.S. Pat. No. 5,739,562 issued Apr. 14, 1998 to Ackland et al.

In general, it is desirable to provide cameras which generate high quality images and which operate over an extremely large dynamic range, including both daytime and nighttime conditions. In addition, the camera should have a small physical size and low electrical power requirements, thereby making head-mounted and battery-operated applications practical.

SUMMARY OF THE INVENTION

According to a first aspect of the invention, a camera is provided. The camera comprises a photocathode operable in a night mode wherein electrons are generated in response to incident light, an active pixel sensor comprising an array of pixels for sensing electrons in the night mode, a power supply for energizing the photocathode in the night mode in response to a control signal, and a power supply control circuit for providing the control signal to the power supply in response to a sensed incident light level. The power supply provides to the photocathode an average energy level that increases as the sensed incident light level decreases.

Preferably, the power supply comprises a gated power supply, and the control signal comprises a gating signal having a duty cycle that increases as the sensed incident light level decreases. The duty cycle is defined as the fraction of the time, within any given field time of the active pixel sensor, that the gating signal requests the high voltage supply to be in its energized state. The active pixel sensor has an associated field time for sensing an image and for outputting signals representative of the image. The gating signal preferably has a period that corresponds to the field time. The gating signal may be a bi-level signal in which one level corresponds to the state where the high voltage power supply is energized and the other level controls the power supply to its quiescent state. The field time of the active pixel sensor includes readout times when pixels are being read out and non-readout times when pixels are not being read out. The control circuit preferably includes means for switching states of the gating signal during the non-readout times when pixels are not being read out.

In a first embodiment, the control circuit generates the power supply control signal in response to a video output level of the active pixel sensor. In a second embodiment, the image sensor further comprises an electron shielded light detector that is shielded from the electrons generated by the photocathode. The light detector generates a light detector signal in response to incident light, and the control circuit generates the power supply control signal in response to the light detector signal. In a third embodiment, the control circuit generates the power supply control signal based on both the light detector signal and the video output level of the active pixel sensor.

According to another aspect of the invention, the photocathode may be operable in a day mode in which a fraction of the incident light is transmitted through the photocathode and wherein the pixels sense light in the day mode. The power supply control circuit may further comprise means for switching the power supply off in the day mode when the sensed incident light level is greater than a predetermined value and for supplying the control signal to the power supply in the night mode when the sensed light level is less than the predetermined value.

According to yet another aspect of the invention, the camera further comprises a lens positioned between the object being imaged and the photocathode, and a lens position actuator for moving the lens., in response to a position control signal, between a night position wherein an image of the object is focused on the photocathode, and a day position wherein an image of the object is focused on the active pixel sensor. A position control circuit provides the position control signal to the lens position actuator in response to the sensed incident light level. The image sensor may further comprise an electron shielded light detector that is shielded from the electrons generated by the photocathode. The electron shielded light detector generates a light detector signal which is used by the position control circuit to control movement of the lens between the night position and the day position.

In a preferred embodiment, the active pixel sensor, the power supply control circuit and the position control circuit are fabricated on a single substrate.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
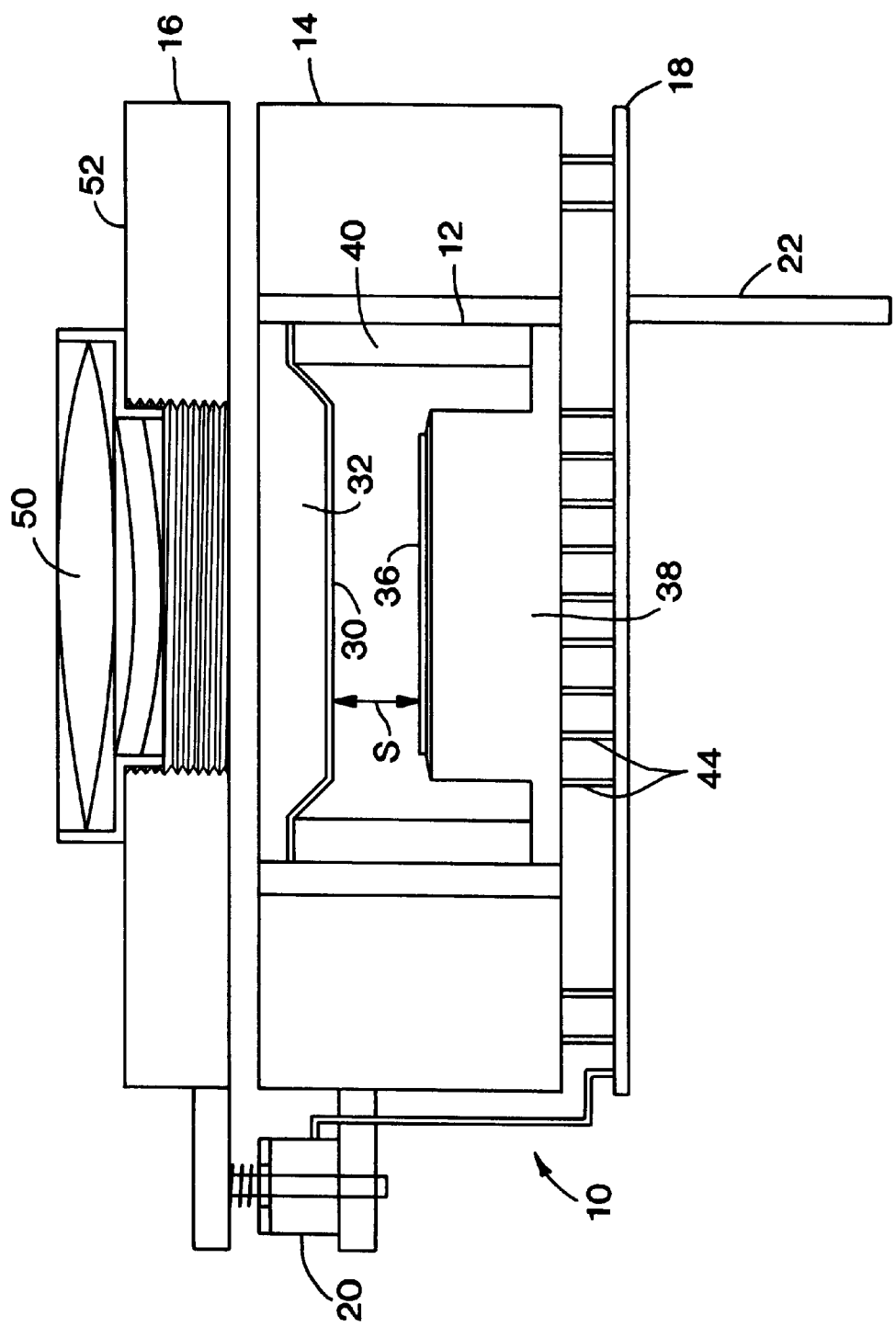
FIG. 1 is a simplified cross-sectional view of an embodiment of a camera in accordance with the invention.
Figure 2:
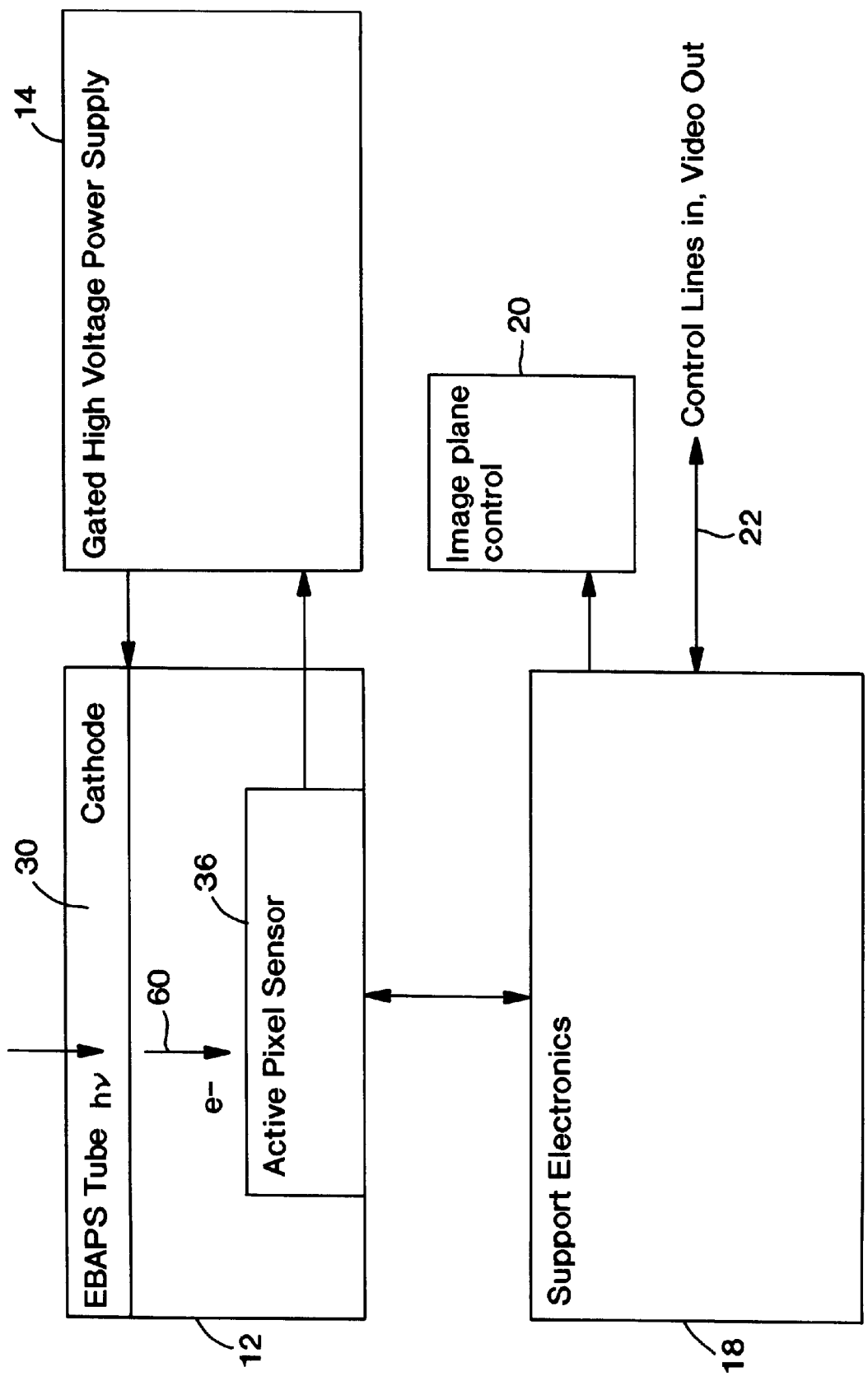
FIG. 2 is a functional block diagram of the camera of FIG. 1.

An example of camera in accordance with the invention is shown in FIG. 1. A functional block diagram of the camera is shown in FIG. 2. Like elements in FIGS. 1 and 2 have the same reference numerals. A camera 10 includes an electron bombarded active pixel image sensor tube 12, a gated high voltage power supply 14, a lens assembly 16, a support electronics board 18 and a lens position actuator 20. In the example of FIG. 1, power supply 14 has a toroidal shape and surrounds sensor tube 12. Lens assembly 16 is positioned in front of a light input to sensor tube 12. Sensor tube 12, power supply 14 and lens position actuator 20 have electrical connections to support electronics board 18. In the case of the gating signal for the high voltage power supply, the support electronics board 18 provides a convenient path by which to connect an active pixel sensor 36 in sensor tube 12 to the power supply 14. A cable 22 connects support electronics board 18 to external circuitry.

Sensor tube 12 includes a photocathode 30 mounted on a glass faceplate 32 and active pixel sensor 36 mounted on a header 38. Faceplate 32 and header 38 are spaced apart by a cylindrical ceramic and metal tube wall 40 which serves as part of a vacuum envelope. Faceplate 32 and header 38 are hermetically sealed to opposite ends of tube wall 40 to form the vacuum envelope. The interior of the vacuum envelope of the sensor tube 12 is evacuated to ultra high vacuum, preferably to less than $1\times10^{-10}$ torr. Photocathode 30 and active pixel sensor 36 are mounted in parallel, spaced relationship and may have a spacing S on the order of 0.5 mm. An electrical connection to photocathode 30 may extend through the vacuum seal between faceplate 32 and tube wall 40. Header 38 includes electrical feedthroughs 44 for electrical connection between active pixel sensor 36 and support electronics board 18.

Lens assembly 16 includes a lens 50 secured in a lens mount 52. Lens position actuator 20 moves lens assembly 16, in response to a position control signal, between a night position and a day position. In the night position, an image of an object is focused on photocathode 30. In the day position, an image of the object is focused on active pixel sensor 36. The required movement is on the order of 0.5 mm. Lens position actuator 20 may, for example, be a bi-stable solenoid actuator which only requires power when the lens is in motion. The use of self-jigging position stops eliminates the need for high precision motion control. In general, lens 50 is moved relative to sensor tube 12. Thus, lens 50 may be moved when sensor tube 12 is fixed in position, or sensor tube 12 may be moved when lens 50 is fixed in position.

Operation of camera 10 is described with reference to FIGS. 1 and 2. As noted above, camera 10 may be operable in a relatively low light level night mode and in a relatively high light level day mode. In the day mode, power supply 14 is turned off, and photocathode 30 is not energized. Photocathode 30 is sufficiently light-transmissive to transmit a fraction of the incident light to active pixel sensor 36. In the day mode, active pixel sensor 36 obtains an image in conventional fashion based on incident light.

In low light level conditions, camera 10 is switched to the night mode, and power supply 14 is energized to provide an output duty cycle that is an inverse function of light level, as described in detail below. The gated power supply output is supplied to photocathode 30. Photocathode 30 generates electrons 60, as shown in FIG. 2, in response to incident light. Electrons 60 are accelerated from photocathode 30 to active pixel sensor 36 by an applied bias of approximately 2000 volts between photocathode 30 and active pixel sensor 36. Active pixel sensor 36 is configured, as described below, to sense electrons 60 in the night mode. Each of the pixels of active pixel sensor 36 generates a signal that is a function of the incident electrons, which is in turn a function of the light incident on photocathode 30. The outputs of the active pixel sensor 36 thus represent an image of the object of interest.

Camera 10 operates in the day mode when the incident light level is sufficient for operation of active pixel sensor 36. When the light level decreases to the point at which the signal to noise ratio of the image generated by the active pixel sensor 36 is unacceptable, the camera 10 switches to the night mode and energizes photocathode 30. In the night mode, the electrons 60 sensed by active pixel sensor 36, permit image sensing under conditions that would otherwise provide insufficient light to obtain an image.

As noted above, photocathode 30 is at least semitransparent to wavelengths of interest when it is not energized. When photocathode 30 is energized by gated high voltage power supply 14, it generates electrons in response to incident light. Suitable photocathodes 30 include multialkali, GaAs, GaAsP, InGaAs and any other semiconductor photocathodes that are semi-transmissive in the spectral range of the active pixel sensor.

As indicated above, active pixel sensor 36 is sensitive to both light energy and to electrons. A suitable active pixel sensor is one which has been processed so as to efficiently collect and sense the electron-hole pairs generated through impact ionization of the high-energy cathode photoelectrons 60. This active pixel sensor can be either a back side thinned device or a front side illuminated device based on cost and performance considerations.

Commercial active pixel sensors may employ automatic gain control techniques that limit the duty cycle over which each individual pixel integrates light induced charge. Although this would function to limit the output signal level in an electron bombarded active pixel sensor, this approach would lead to unacceptably short photocathode life. Photocathodes tend to degrade with use in a vacuum tube. Under fixed conditions, photocathode degradation is typically proportional to the charge drawn from the photocathode. Consequently, if the photocathode is left energized when high light levels are present, tube life will be reduced. The present invention employs signals from the active pixel sensor which control a gated high voltage power supply. The low duty cycle of the power supply when high light levels are present limits the charge transferred from the photocathode, thereby extending tube life.

Figure 3:
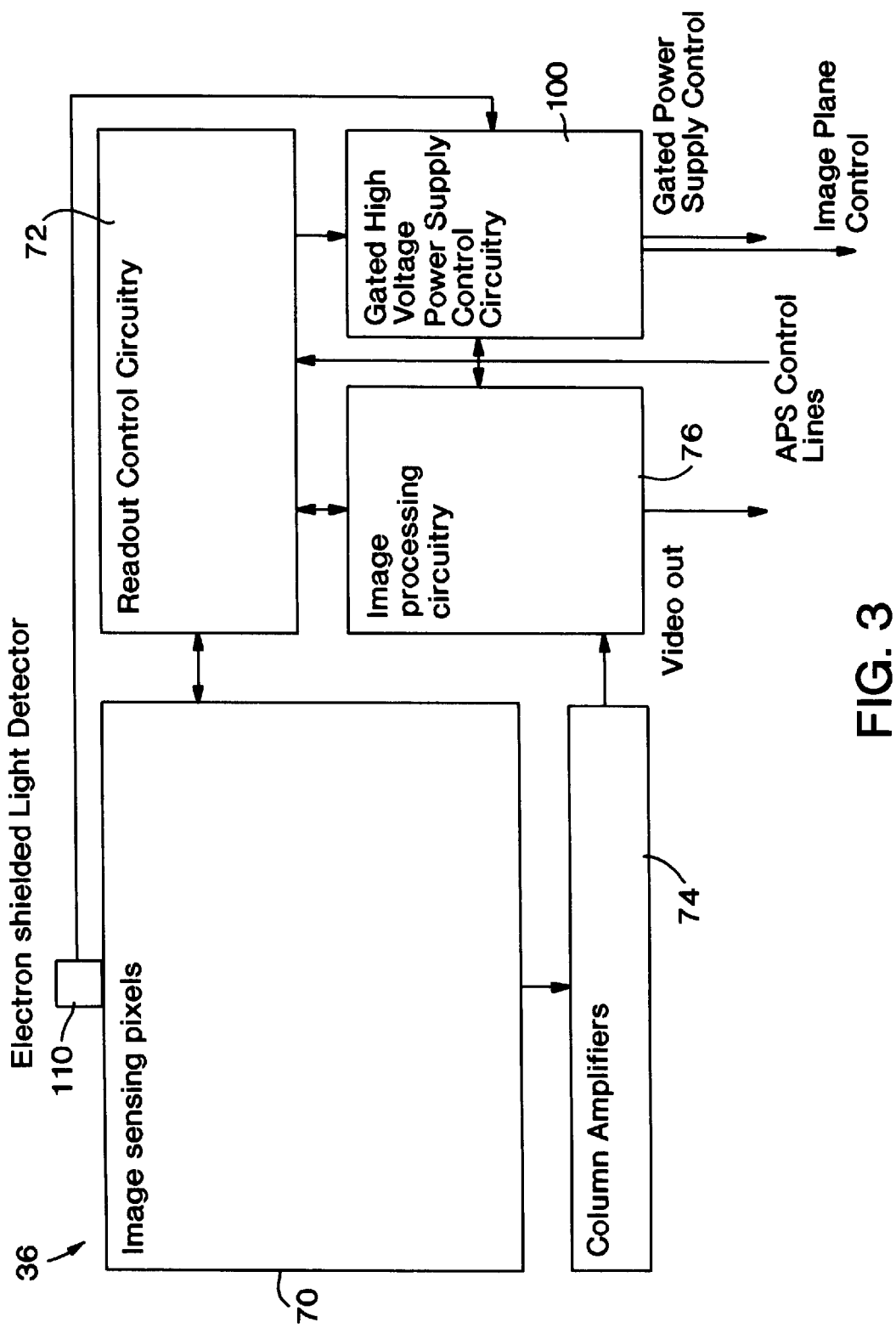
FIG. 3 is a block diagram of the active pixel sensor, which incorporates a control circuit.

A block diagram of the active pixel sensor 36 and related control circuitry is shown in FIG. 3. Active pixel sensor 36 includes an array 70 of image sensing pixels, readout control circuitry 72, column amplifiers 74 and image processing circuitry 76. The array 70 may be configured as rows and columns of pixels. The image sensing pixels sense light or electrons and supply output signals representative of the sensed light or electrons. The readout control circuitry 72 may enable a selected row of array 70, and column amplifiers 74 sense the outputs of the pixels in the selected row. The outputs of column amplifiers 74 are supplied to image processing circuitry 76, which assembles the pixel output signals into a video output signal. In the case of an RS170 active pixel sensor, the image processing circuitry adds the appropriate synchronization pulses in order to generate a composite video signal. The rows of pixels in array 70 are selected in sequence until the entire array 70 has been read out, thus providing a video output signal representative of an image. An image frame may include interlaced fields, as known in the art. Details regarding the structure and operation of active pixel sensors are known to those skilled in the art.

As indicated, the readout control circuitry 72 typically enables readout of one row of pixels at a time, with sequential selection of rows of pixels. Non-selected rows of pixels integrate received light or electrons. Thus, integration and readout typically occur concurrently in an active pixel sensor.

A control circuit 100 provides a power supply control signal to power supply 14 and a position control signal to control the lens position. The lens control actuator 20 may be controlled via a driver on the support electronics board 18. Control circuit 100 receives a video level signal and a readout control circuit enable signal. The video level signal is representative of the current video output level of the active pixel sensor. The image processing circuitry 76 may extract a signal proportional to the average level of the video. This signal is used to determine the most appropriate duty cycle for the high voltage power supply 14. The duty cycle is defined as the fraction of the time, within any given field time of the active pixel sensor, that the power supply control signal requests the power supply 14 to be in its energized state. The time constant over which the duty cycle is changed may be controlled to be many times the period of a single field. The readout control circuit enable signal is a binary signal that is asserted when no pixels are being read.

Control circuit 100 also receives a light detector signal from an electron shielded light detector 110. The electron shielded light detector 110 senses incident light, but is shielded from electrons generated by photocathode 30. Light detector 110, for example, may comprise a photodiode that is overlayed by about 2000 Angstroms of $SiO_2$ and is positioned immediately adjacent to one edge of the pixel array 70. The photodiode should be designed such that its spectral response roughly matches that of a pixel in array 70. This results in a detected light level which is nominally proportional to the light which is incident upon the pixels. In another embodiment, the electron shielded light detector may be implemented by shielding the first few rows of standard pixels in the array 70 of image sensing pixels. These pixels may be read out during the vertical blanking period of the RS170 format. Another approach to implementing an electron shielded light detector includes interspersing a pattern of shielded pixels throughout the active area of array 70. If, for example, the center pixel of each 5×5 pixel group is shielded, low level light performance drops by only about 4%. The isolated "dark" pixels, if objectionable, may be removed or averaged by subsequent signal processing. Another somewhat more complicated approach to implementing an electron shielded light detector is to form a second light detector physically below the electron detection layer. Although this approach complicates pixel design and readout, it allows complete monitoring of transmitted light. This stacked detector approach results in two distinct images. The first image is formed by both electrons and absorbed light in the night mode or just absorbed light in the day mode. The second image is formed by absorbed light only. These images may be combined for false color or increased dynamic range.

The primary purpose of the electron shielded light detector is to determine if sufficient light is incident upon the active pixel sensor to allow day mode operation. The amount of light available to the active pixel sensor is a function of a number of parameters which include the spectral transmission of the photocathode and the spectral distribution of the scene illumination. The difficulty associated with predicting these parameters, and their variance over differing cathode types, makes the use of the electron shielded light detector 110 the preferred approach to determining when to switch between night and day modes If the electron shielded light detector 110 is used to determine the day to night mode transition, hysteresis can be incorporated into the set points so as to eliminate excessive cycling between modes. Approaches which employ multiple electron shielded light detectors are preferred in order to avoid false signals associated with an isolated bright light imaged directly upon a single electron shielded light detector.

Figure 4:
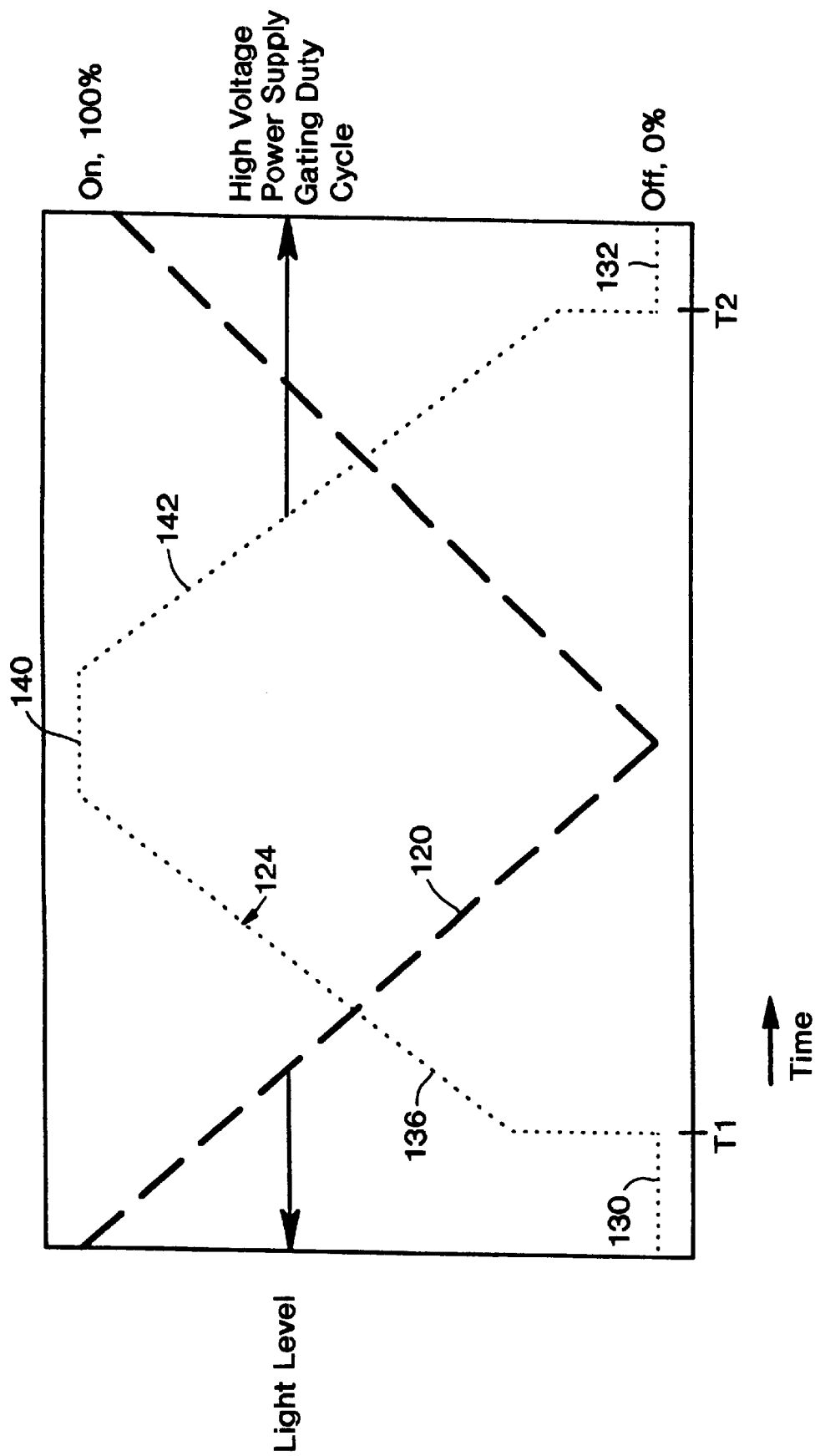
FIG. 4 is a graph of light level and power supply duty cycle as a function of time, illustrating the variation of the power supply duty cycle with light level.

Gated high voltage power supply 14 (FIGS. 1 and 2) generates a gated output voltage in response to the power supply control signal. The gated output voltage has a period that preferably corresponds to the field time of the active pixel sensor and has a variable duty cycle which increases as the incident light level decreases. The operation of the gated high voltage power supply 14 is illustrated in FIG. 4. Curve 120 represents a light level that first decreases with time and then increases with time. Curve 124 represents the corresponding duty cycle of the power supply 14. Portions 130 and 132 of curve 124 represent the day mode in which power supply 14 is turned off and photocathode 30 transmits light to active pixel sensor 36. At time T1, the incident light level has decreased to the level required for switching to the night mode. Power supply 14 is turned on with a low duty cycle. Coincident with this activation of the gated high voltage power supply, the image plane control line is switched to the level indicating night mode operation. This in turn causes the focal plane of the lens 50 to shift onto the photocathode 30. Although the duty cycle at this point is low, it is sufficient to allow the electron-induced signal to overwhelm the remaining light induced signal, thus maintaining a sharply focused image. As the light level decreases further, the duty cycle of the output of power supply 14 increases over a portion 136 of curve 124. During a portion 140 of curve 124, the incident light level is sufficiently low to require that power supply 14 have a 100% duty cycle (on continuously). As the light level later increases, the power supply duty cycle decreases in portion 142 of curve 124 until the day mode is again activated at time T2, and the power supply 14 is turned off.

Figure 5:
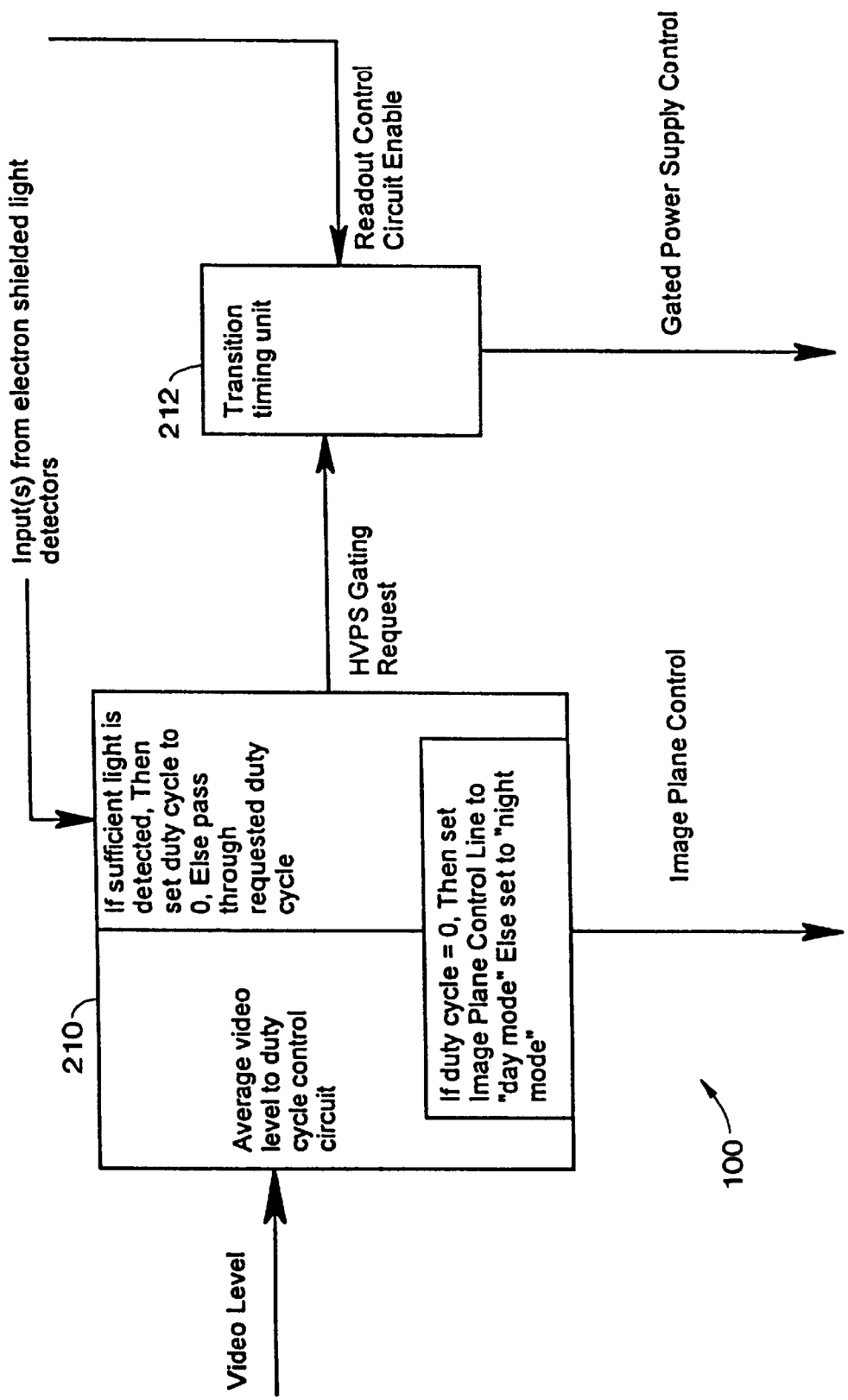
FIG. 5 is a block diagram of the control circuit shown in FIG. 3.
Figure 6:
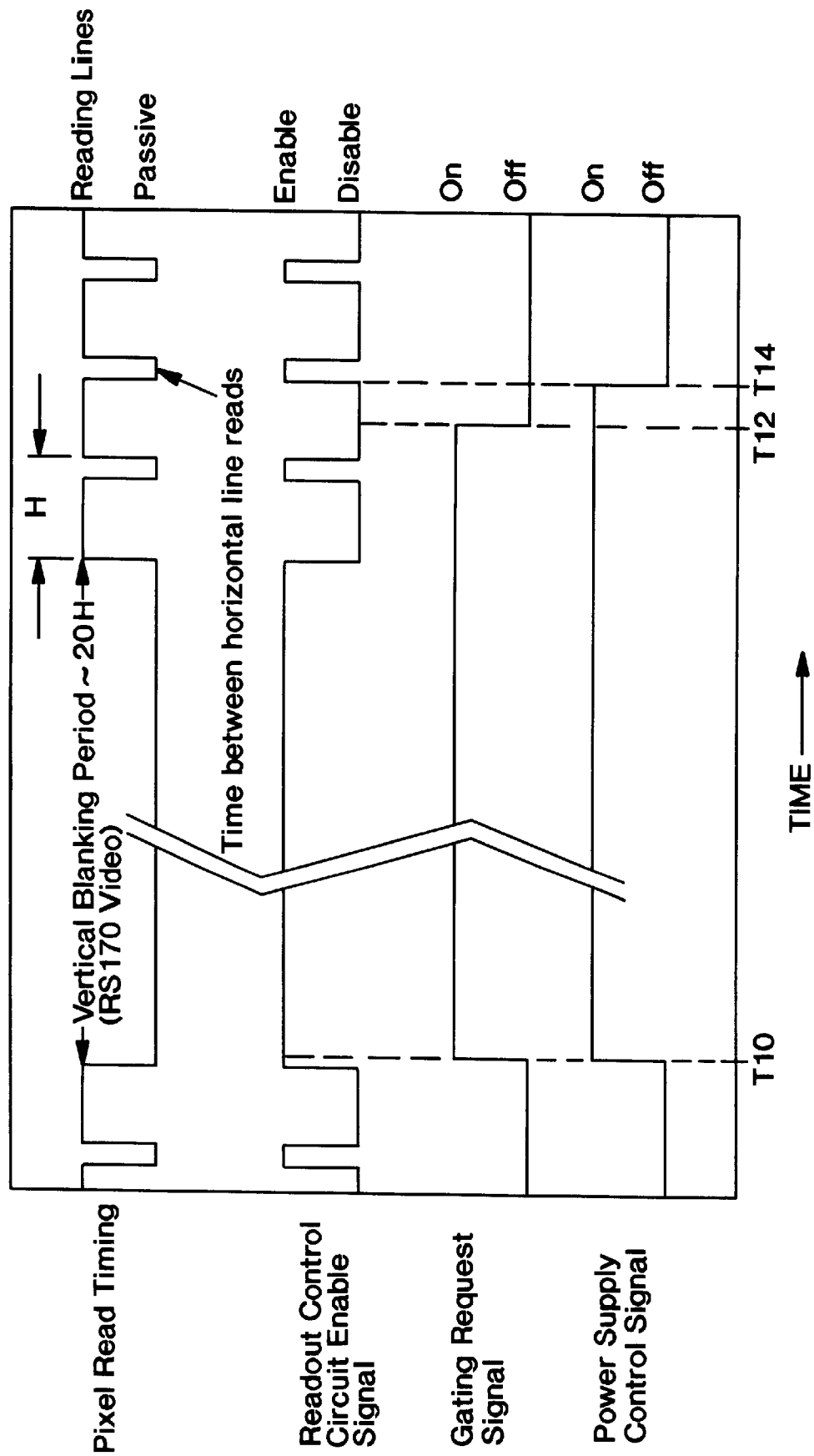
FIG. 6 is a timing diagram that illustrates signals associated with operation of the control circuit of FIG. 5, for the case of an active pixel sensor operated so as to generate an RS170 output.

A functional block diagram of control circuit 100 is shown in FIG. 5. Related waveforms are shown in FIG. 6. A functional block 210 receives an average video level from image processing circuitry 76 and converts the average video level signal to a duty cycle control signal in accordance with a predetermined conversion function. That is, each value of average video level corresponds to a specified duty cycle. Functional block 210 also receives inputs from one or more electron shielded light detectors as described above. If the electron shielded light detector signal indicates sufficient light for operation in the day mode, the duty cycle is set to zero. Otherwise, the duty cycle control signal is passed to a transition timing unit 212 as a gating request signal. If the electron shielded light detector signal indicates sufficient light for operation in the day mode, then the image plane control signal is set to day mode. Otherwise the image plane control signal is set to night mode. As indicated above, the image plane control signal is supplied to lens control actuator 20 for controlling the position of lens 50.

Thus, block 210 of control circuit 100 controls switching of camera 10 from the night mode to the day mode and from the day mode to the night mode in response to the sensed incident light level. In the day mode, power supply 14 is turned off, whereas in the night mode, power supply 14 is energized with a duty cycle that increases as the incident light level decreases. As indicated above, the duty cycle is typically non-zero at the point of switching between the day mode and the night mode.

The transition timing unit 212 receives the gating request signal and the readout control circuit enable signal. As shown in FIG. 6, the readout control circuit enable signal is asserted when pixels are not being read by the readout control circuit 72. The transition timing unit 212 delays transitions in the power supply control signal, if necessary, until the readout control circuit enable signal is asserted. Referring to FIG. 6, the gating request signal is asserted at time T10. Since the readout control circuit enable signal is asserted at time T10, the power supply control signal can be switched immediately, and the power supply 14 is switched on. The gating request signal turns off at time T12. Since the readout control circuit enable signal is not asserted at time T12, the power supply control signal is held on until time T14 when the readout control circuit enable signal is asserted. Thus, power supply 14 is switched off at time T14. This ensures that transients generated by turn on and turn off of high voltage power supply 14 do not interfere with readout of information from pixel array 70. In particular, power supply 14 is not gated on or off when pixels are being read by readout control circuitry 72 (FIG. 3).

The functions illustrated in FIGS. 5 and 6 may be implemented using conventional analog and digital circuitry. Preferably, the control circuitry is incorporated into the active pixel sensor integrated circuit.

Camera 10 is described above as having a night mode and a day mode. In another configuration, camera 10 may be utilized only in the night mode. When camera 10 is used only in the night mode, certain optional modifications may be made. In particular, lens position actuator 20 may be omitted from camera 10, and lens 50 may be mounted permanently in the night position. In addition, electron shielded light detector 110 may be omitted from camera 10. In this case, switching between the day mode and night mode is not required, and the duty cycle of the power supply control signal decreases to zero as the incident light level increases.

The present invention permits a very compact, low light level camera to be manufactured. Active pixel sensors are well suited to the fabrication of integrated video cameras. The incorporation of all required synchronization and signal conditioning electronics onto the active pixel sensor integrated circuit allows extremely small, low cost, low power video cameras to be made. The same advantages that active pixel sensors bring to standard video applications apply to the electron bombarded image sensors disclosed herein. However, low light level cameras have dynamic range requirements which may exceed that of most active pixel sensors. Even in the case where an active pixel sensor is designed with sufficient dynamic range, tube operation or life considerations make gain control desirable. Gain control can be implemented off chip by including circuitry to monitor peak or average video level and to generate an appropriate control signal for the gated high voltage power supply. However, this circuitry adds size, weight and expense to the camera. Furthermore, in the case where the gain control signal constitutes a duty cycle control signal which directly controls the high voltage power supply output, the timing of the high voltage transitions can be controlled so as to minimize image degradation. Accordingly, control circuit 100 and active pixel sensor 36 are preferably packaged together within sensor tube 12 and most preferably are fabricated on a single integrated circuit substrate.

This application is being simultaneously filed with a related application entitled Electron Bombarded Active Pixel Sensor, invented by Aebi and Boyle, and including background information applicable to this invention. The disclosure of this simultaneously filed application is incorporated herein by reference.

This simultaneously filed application describes the image sensor, an application of which, is further described herein. Among other things, as described in Ser. No. 09/356,800, low cost standard CMOS fabrication technology is used in making the imager. For convenience and for descriptive purposes, the device or structure may be referred to as a CMOS imager, as is the case in Ser. No. 09/356,800.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A camera comprising:
   a photocathode operable in a night mode wherein electrons are generated in response to incident light;
   a CMOS imager in spaced relation to said photocathode, said photocathode being positioned between the front side of said CMOS imager and an object being imaged, said CMOS imager comprising an array of pixels on the front surface of the CMOS imager for sensing electrons in said night mode;
   a power supply for energizing said photocathode in said night mode in response to a power supply control signal, said power supply comprising a gated power supply and said control signal comprising a gating signal having a duty cycle that increases as the light level decreases; and
   a power supply control circuit for providing said control signal to said power supply in response to the incident light level, wherein said power supply provides to said photocathode an average energy level that increases as the incident light level decreases.

2. A camera as defined in claim 1 wherein said CMOS imager has an associated field time for sensing an image and for outputting signals representative of the image, and wherein said gating signal has a period that corresponds to said field time.

3. A camera as defined in claim 2 wherein said field time includes readout times when pixels of said CMOS imager are being read out and non-readout times when pixels of said CMOS imager are not being read out, and wherein said control circuit includes means for switching states of said gating signal during the non-readout times when pixels of said CMOS imager are not being read out.

4. A camera as defined in claim 1 wherein said control circuit generates said power supply control signal in response to a video output level of said CMOS imager.

5. A camera as defined in claim 1 wherein said CMOS imager and said power supply control circuit are fabricated on a single substrate.

6. A camera as defined in claim 1 wherein said photocathode is operable in a day mode in which a fraction of the incident light is transmitted through said photocathode and wherein said pixels of said CMOS imager sense light in said day mode.

7. A camera as defined in claim 6 wherein said power supply control circuit further comprises means for switching said power supply off in said day mode when the incident light level is greater than a predetermined value and for supplying the control signal to said power supply in said night mode when the incident light level is less than the predetermined value.

8. A camera as defined in claim 6 further comprising a lens positioned between the object being imaged and said photocathode, a lens positioning actuator for moving said lens in response to a position control signal, between a night position wherein an image of the object is focused on said CMOS imager, and a position control circuit for providing said position control signal to said lens position actuator in response to the incident light level.

9. A camera as defined in claim 8 wherein said position control circuit and said CMOS imager are fabricated on a single substrate.

10. A camera as defined in claim 6 further comprising an electron shielded light detector that is shielded from the electrons generated by said photocathode, said light detector generating a light detector signal in response to incident light, and means for switching to said day mode when said light detector signal exceeds a predetermined level and for switching to said night mode when said light detector signal is less than said predetermined level.

11. A camera as defined in claim 10 wherein said switching means includes hysteresis.

12. A camera as defined in claim 1 further comprising a vacuum enclosure, wherein said photocathode and said CMOS imager are mounted within said vacuum enclosure.

13. A camera in accordance with claim 1 including an integrated electron shielded light detector comprising a standard CMOS pixel located within the image plane.

14. A camera as defined in claim 13 wherein at least a pixel associated with the electron shielded light detector creates a signal used for gain control, which signal is eliminated from image data during image processing.

15. A camera as defined in claim 6, further comprising a lens between the object being imaged and said photocathode, an actuator to shift the focal plane of said lens in response to a position control signal between a night position wherein the image of the object is focused onto said photocathode and a day position wherein an image of the object is focused onto said CMOS imager, and a position control circuit for providing said position control signal to said actuator in response to the incident light level.

16. A camera comprising:
  a photocathode operable in a night mode wherein electrons are generated in response to incident light;
  an active pixel sensor in spaced relation to said photocathode, said photocathode being positioned between said active pixel sensor and an object being imaged, said active pixel sensor comprising an array of pixels for sensing electrons in said night mode;
  a power supply for energizing said photocathode in said night mode in response to a power supply control signal, said power supply comprising a gated power supply and said control signal comprising a gating signal having a duty cycle that increases as the light level decreases;
  a power supply control circuit for providing said control signal to said power supply in response to the incident light level; and
  an integrated electron shielded light detector located within the image plane and shielded from electrons generated by said photocathode, said light detector generating a signal in response to incident light, wherein said power supply control circuit incorporates the output from said light detector and the output from the pixels to generate the power supply control signal.

17. A camera as defined in claim 6 wherein said control circuit generates said power supply control signal in response to said light detector signal and a video output level of said active pixel sensor.

18. A camera comprising:
  a photocathode operable in a night mode wherein electrons are generated in response to incident light and operable in a day mode in which a fraction of the incident light is transmitted through said photocathode and wherein pixels of an active pixel sensor sense light in said day mode;
  an active pixel sensor in spaced relation to said photocathode, said photocathode being positioned between said active pixel sensor and an object being imaged, said active pixel sensor comprising an array of pixels for sensing electrons in said night mode and light in said day mode;
  a power supply for energizing said photocathode in said night mode in response to a power supply control signal, said power supply comprising a gated power supply and said control signal comprising a gating signal having a duty cycle that increases as the light level decreases;
  a lens positioned between the object being imaged and said photocathode, a lens position actuator for moving said lens, in response to a position control signal, between a night position wherein an image of the object is focused on said photocathode, and a day position wherein an image of the object is focused on said active pixel sensor and a position control circuit for providing said position control signal to said lens position actuator in response to the incident light level;
  an electron shielded light detector that is shielded from the electrons generated by said photocathode, said light detector generating a light detector signal in response to incident light, wherein said position control circuit generates said position control signal in response to said light detector signal; and
  a power supply control circuit for providing said control signal to said power supply in response to the incident light level, wherein said power supply provides to said photocathode an average energy level that increases as the incident light level decreases.

19. A camera comprising:
  a photocathode operable in a night mode wherein electrons are generated in response to incident light and operable in a day mode wherein a fraction of the incident light is transmitted through said photocathode;
  an active pixel sensor in spaced relation to said photocathode, said photocathode being positioned between said active pixel sensor and an object being imaged, said active pixel sensor comprising an array of pixels, each capable of measuring the charge accumulated in said night mode or in said day mode;

an integrated electron shielded light detector comprising a standard active pixel located within the image plane and shielded from electrons generated by said photocathode to generate a control signal to set the camera in day or night mode in response to light at said detector above a predetermined level;

a power supply for energizing said photocathode in said night mode;

a lens positioned between said object being imaged and said photocathode;

a lens position actuator for moving said lens relative to said photocathode and said active pixel sensor, in response to a position control signal, between a night position wherein an image of the object is focused on said photocathode, and a day position wherein an image of the object is focused on said active pixel sensor; and a position control circuit for providing said position control signal to said lens position actuator in response to the incident light level at said electron shielded light detector, wherein said lens is moved to the night position in the night mode and is moved to the day position in the day mode.

20. A camera as defined in claim 19 wherein said active pixel sensor and said position control circuit are fabricated on a single substrate.

21. A camera as defined in claim 19 further comprising a vacuum enclosure, wherein said photocathode and said active pixel sensor are mounted within said vacuum enclosure.

22. A camera comprising:

a photocathode operable in a night mode wherein electrons are generated in response to incident light and operable in a day mode wherein a fraction of the incident light is transmitted through said photocathode;

a CMOS imager in spaced relation to said photocathode, said photocathode being positioned between said CMOS imager and an object being imaged, said CMOS imager comprising an array of pixels on the front side of said CMOS imager for sensing electrons in said night mode and for sensing light in said day mode;

an electron shielded light detector associated with said CMOS imager to sense incident light levels, an automated gain control circuit associated with the CMOS imager to generate a control signal having a duty cycle which is less than a fraction of the field time of the CMOS imager and in which the field time includes read out and non read out times of the CMOS imager and in which charge is sensed on said CMOS imager during the read out times, a control circuit that transitions between energized and non-energized states during said non read out times;

a vacuum enclosure containing said photocathode and said CMOS imager;

a power supply for energizing said photocathode in said night mode in response to a power supply control signal, said power supply comprising a gated power supply; and a power supply control circuit for switching said power supply off in said day mode when the incident light level is greater than a predetermined value and for supplying the control signal as a gating signal having a duty cycle that increases as the incident light level decreases in said night mode when the incident light level is less than the predetermined value.

23. A camera as defined in claim 22 further comprising:

a lens positioned between the object being imaged and said photocathode;

a lens position actuator for moving said lens, in response to a position control signal, between a night position wherein an image of the object is focused on said photocathode, and a day position wherein an image of the object is focused on said CMOS imager; and, a position control circuit for providing said position control signal to said lens position actuator in response to incident light level, wherein said lens is moved to the night position in the night mode and is moved to the day position in the day mode.

24. A camera as defined in claim 23 further comprising an electron shielded light detector that is shielded from the electrons generated by said photocathode, said light detector generating a light detector signal in response to incident light, wherein said position control circuit generates said position control signal in response to said light detector signal.

25. A camera as defined in claim 23 wherein said CMOS imager, said power supply control circuit and said position control circuit are fabricated on a single substrate.

\* \* \* \* \*

UNITED STATES PATENT AND TRADEMARK OFFICE
CERTIFICATE OF CORRECTION

PATENT NO.    : 6,307,586 B1
DATED         : October 23, 2001
INVENTOR(S)   : Kenneth A. Costello It is certified that error appears in the above-identified patent and that said Letters Patent is hereby corrected as shown below:

<u>Column 10,</u>
Line 13, change "6" to -- 16 --.

Signed and Sealed this

First Day of July, 2003

JAMES E. ROGAN
*Director of the United States Patent and Trademark Office*